US010249336B1

(12) United States Patent
Krichevsky et al.

(10) Patent No.: US 10,249,336 B1
(45) Date of Patent: Apr. 2, 2019

(54) ARCHITECTURE FOR METAL-INSULATOR-METAL NEAR-FIELD TRANSDUCER FOR HEAT-ASSISTED MAGNETIC RECORDING

(71) Applicants: Western Digital Technologies, Inc., San Jose, CA (US); The Provost, Fellows, Foundation Scholars and the other members of the Board, of the College of the Holy and Undivided Trinity of Queen Elizabeth Near Dublin, Dublin (IE)

(72) Inventors: Alexander Krichevsky, Cupertino, CA (US); Frank Bello, Jackson, CA (US); Christopher Wolf, San Jose, CA (US); Fenghua Zong, San Jose, CA (US); Daniel Wolf, San Jose, CA (US); David McCloskey, Co. Louth (IE); Kyle Ballantine, Limerick (IE); John Donegan, Co. Kildare (IE)

(73) Assignees: Western Digital Technologies, Inc., San Jose, CA (US); The Provost, Fellows, Scholars and other Members of Board of Trinity College Dublin, Dublin (IE)

( * ) Notice: Subject to any disclaimer, the term of this patent is extended or adjusted under 35 U.S.C. 154(b) by 0 days.

(21) Appl. No.: 15/853,770

(22) Filed: Dec. 23, 2017

(51) Int. Cl.
*G11B 13/08* (2006.01)
*G11B 5/31* (2006.01)
*G11B 5/00* (2006.01)

(52) U.S. Cl.
CPC .............. *G11B 13/08* (2013.01); *G11B 5/314* (2013.01); *G11B 2005/0021* (2013.01)

(58) Field of Classification Search
None
See application file for complete search history.

(56) References Cited

U.S. PATENT DOCUMENTS

| 6,834,027 | B1 | 12/2004 | Sakaguchi et al. |
| 6,930,975 | B2 | 8/2005 | Tawa et al. |
| 7,272,079 | B2 | 9/2007 | Challener |
| 7,359,599 | B2* | 4/2008 | Matsumoto ............ G01Q 60/22 385/47 |
| 7,440,660 | B1 | 10/2008 | Jin et al. |
| 7,567,387 | B2 | 7/2009 | Itagi et al. |
| 7,596,072 | B2 | 9/2009 | Buechel et al. |
| 8,023,228 | B2* | 9/2011 | Sohn ...................... G11B 5/02 360/128 |
| 8,077,559 | B1 | 12/2011 | Miyauchi et al. |
| 8,125,856 | B1 | 2/2012 | Li et al. |
| 8,228,779 | B2 | 7/2012 | Peng et al. |
| 8,264,919 | B2 | 9/2012 | Komura et al. |

(Continued)

FOREIGN PATENT DOCUMENTS

JP 2007188619 A * 7/2007 ............... G11B 5/02

*Primary Examiner* — William J Klimowicz

(57) ABSTRACT

Disclosed herein are embodiments of a heat-assisted magnetic recording (HAMR) device comprising a waveguide and a near-field transducer (NFT) coupled to the waveguide in a direct-fire configuration. The NFT comprises an insulator core encased in a metal portion. The insulator core comprises a rectangular portion and a tapered portion, wherein the rectangular portion is between the waveguide and the tapered portion. The metal portion comprises a plasmonic metal.

22 Claims, 13 Drawing Sheets

(56) References Cited

U.S. PATENT DOCUMENTS

| | | | |
|---|---|---|---|
| 8,385,157 B1 | 2/2013 | Champion et al. | |
| 8,462,592 B1 | 6/2013 | Wolf et al. | |
| 8,897,104 B1 | 11/2014 | Yan et al. | |
| 8,958,168 B1 | 2/2015 | Yuan et al. | |
| 9,064,528 B1 | 6/2015 | Krichevsky et al. | |
| 9,147,415 B2 * | 9/2015 | Clinton | G11B 5/4866 |
| 9,275,659 B2 | 3/2016 | Cheng et al. | |
| 9,336,814 B1 | 5/2016 | Shi et al. | |
| 9,484,051 B1 | 11/2016 | Krichevsky et al. | |
| 2004/0001394 A1 * | 1/2004 | Challener | G11B 5/012 |
| | | | 369/13.32 |
| 2004/0001421 A1 * | 1/2004 | Tawa | B82Y 10/00 |
| | | | 369/112.28 |
| 2011/0170381 A1 | 7/2011 | Matsumoto | |
| 2013/0223196 A1 * | 8/2013 | Gao | G11B 5/6088 |
| | | | 369/13.24 |
| 2015/0179197 A1 * | 6/2015 | Clinton | G11B 5/4866 |
| | | | 369/13.33 |

* cited by examiner

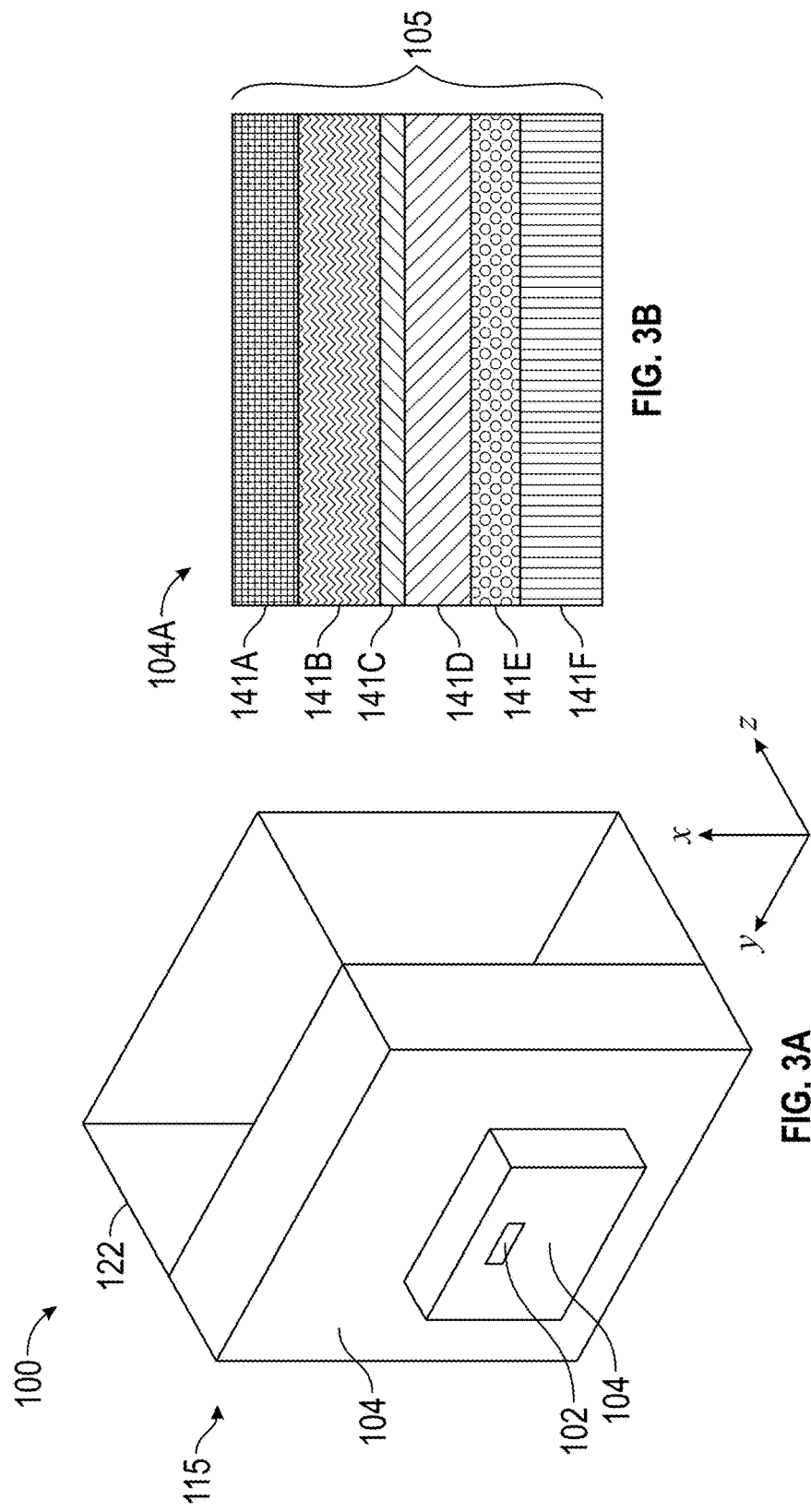

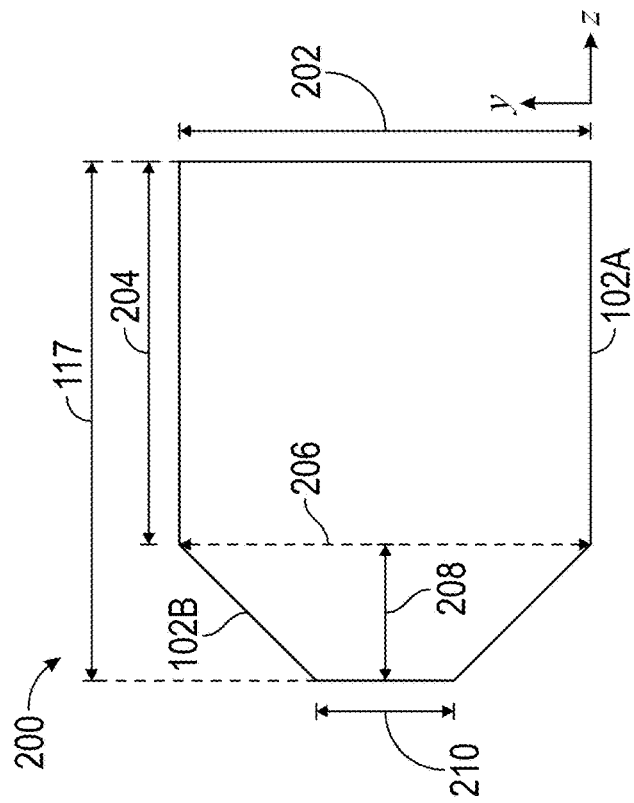
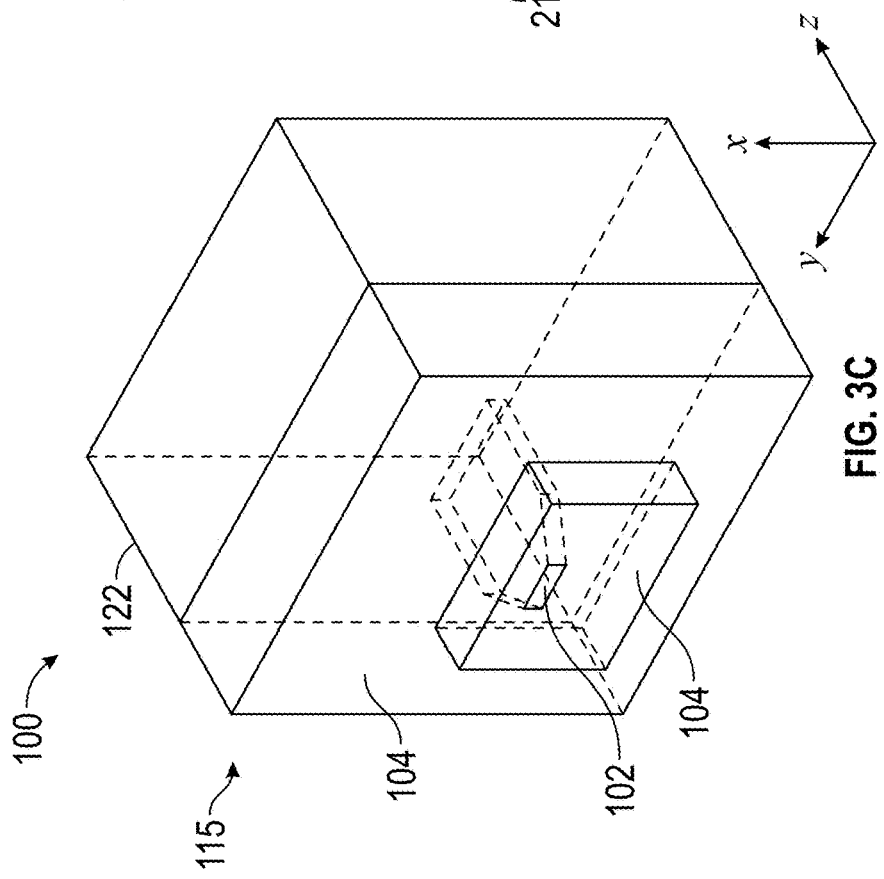
FIG. 3D
FIG. 3C

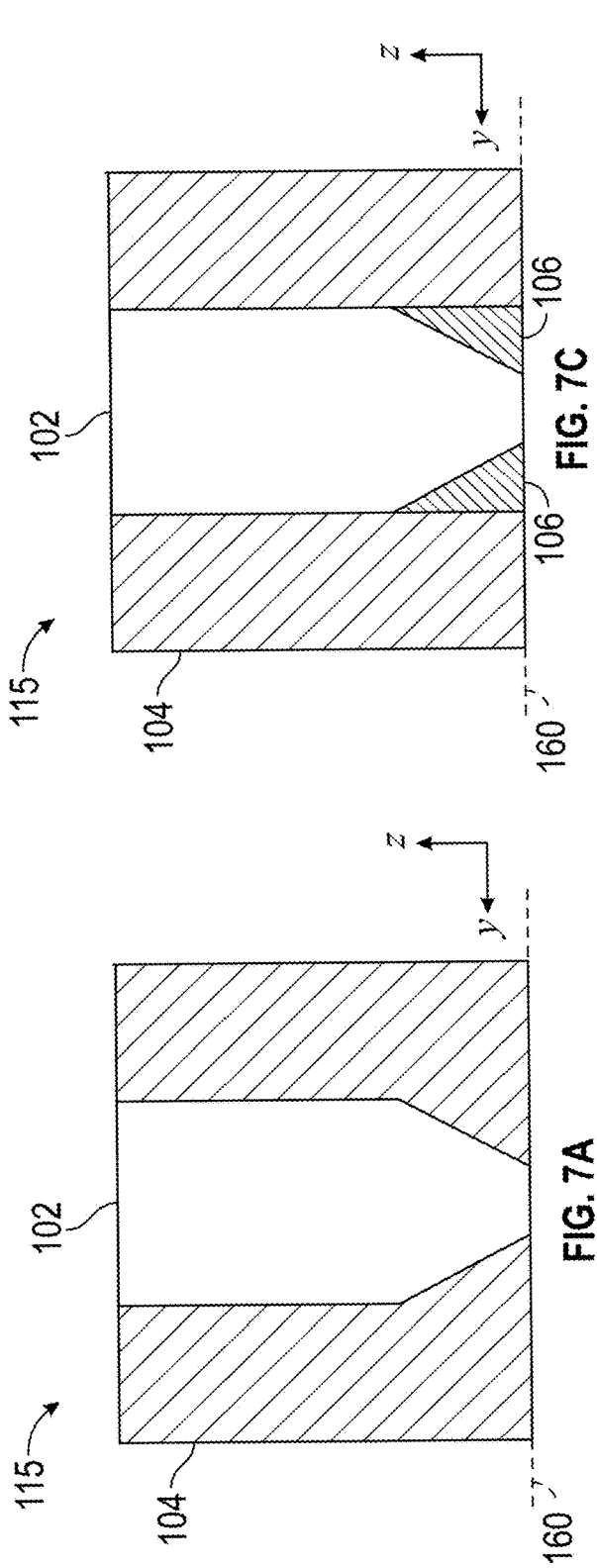

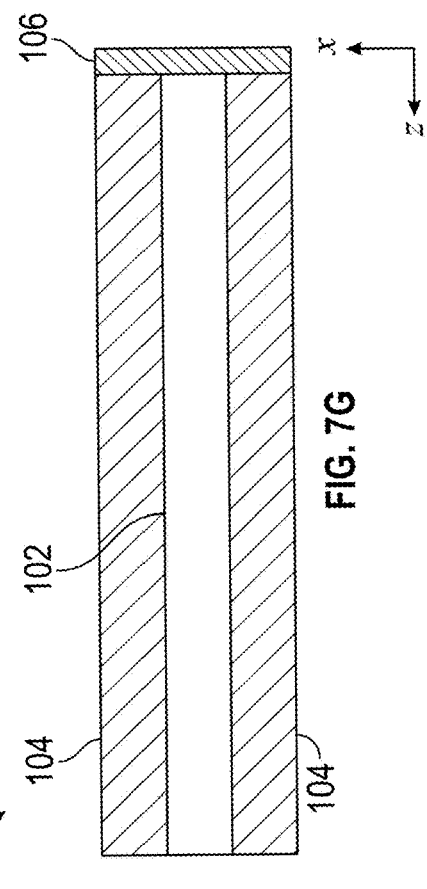
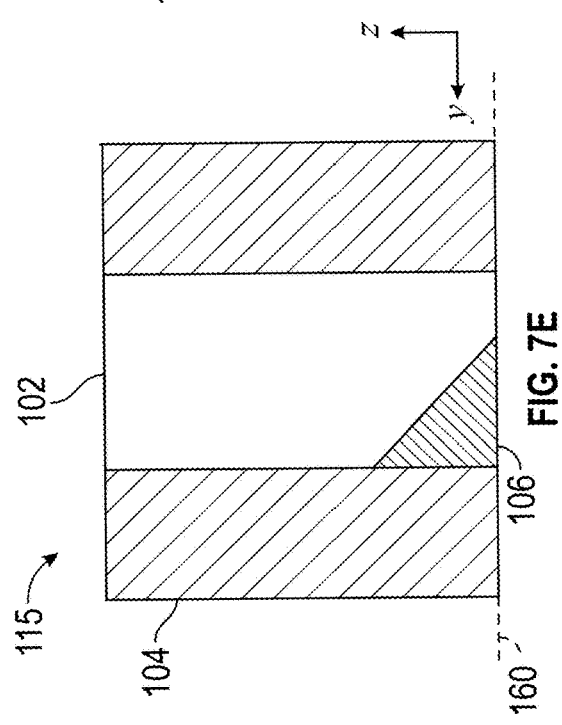
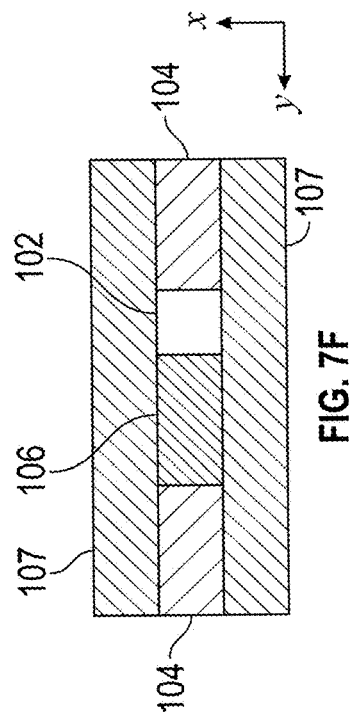
FIG. 7G
FIG. 7E
FIG. 7F

ARCHITECTURE FOR METAL-INSULATOR-METAL NEAR-FIELD TRANSDUCER FOR HEAT-ASSISTED MAGNETIC RECORDING

CROSS-REFERENCE TO RELATED APPLICATIONS

This application is being filed on the same day as, and hereby incorporates by reference the entire contents of, U.S. patent application Ser. No. 15/853,768, entitled "METAL-INSULATOR-METAL NEAR-FIELD TRANSDUCER FOR HEAT-ASSISTED MAGNETIC RECORDING".

BACKGROUND

There is a continuing need to improve the recording density of data storage devices. Such data storage devices include magnetic storage devices, such as magnetic disk drives. The use of thin-film magnetic heads, such as a composite thin-film magnetic head, and higher-performance magnetic recording media has enabled some level of improvement in storage capacity. A thin-film magnetic head may stack, on a substrate, a read head, including a magnetoresistive element (hereinafter also referred to as MR element), and a write head, including an induction-type electromagnetic transducer. In a magnetic disk drive, the thin-film magnetic head is mounted on a slider that flies slightly above the surface of the magnetic recording medium.

Magnetic recording media used in magnetic recording devices, such as hard disk drives, are made of an aggregate of magnetic fine particles, and each bit is recorded using more than one magnetic fine particle. Recording density may be improved by reducing asperities at the borders between adjoining recording bits, which can be achieved by making the magnetic fine particles smaller and using a correspondingly-smaller write head. But decreasing the asperities at the borders between adjacent recording bits causes the thermal stability of magnetization of the magnetic fine particles to decrease with decreasing volume of the magnetic fine particles. To mitigate this problem, the anisotropic energy of the magnetic fine particles may be increased, but doing so leads to an increase in coercivity of the magnetic recording medium, which increases the difficulty of writing data. This problem is exacerbated because it can be difficult to generate a magnetic field having a sufficient magnitude using a small write head.

Heat-assisted magnetic recording (HAMR), also referred to in the art as thermally-assisted magnetic recording (TAMR) or energy-assisted magnetic recording (EAMR), has been developed to allow the use of smaller write heads with higher-coercivity magnetic recording media to improve areal density capacity. HAMR uses heat to lower the effective coercivity of a localized region on the magnetic media surface and writes data within this heated region. The data state becomes "fixed" upon the media cooling to ambient temperatures. Thus, in HAMR, a magnetic recording material with high magneto-crystalline anisotropy ($K_u$) is heated locally during writing to lower the coercivity enough for writing to occur, but the coercivity/anisotropy is high enough that the recorded bits are thermally stable at the ambient temperature of the disk drive (i.e., the normal operating or "room" temperature of approximately 15-30 degrees Celsius). The recorded data may then be read back at ambient temperature by a conventional magnetoresistive read head. HAMR devices have been proposed for both conventional continuous media, wherein the magnetic recording material is a continuous layer on the disk, and for bit-patterned media (BPM), in which the magnetic recording material is patterned into discrete data islands or "bits."

One type of HAMR device uses a laser source and an optical waveguide coupled to a near-field transducer (NFT) for heating the recording material on the disk. A near-field transducer refers to "near-field optics," wherein light is passed through a first element with subwavelength features and the light is coupled to a second element, such as a substrate (e.g., of a magnetic recording medium), located a subwavelength distance from the first element. The NFT is typically located at the air-bearing surface (ABS) of an air-bearing slider that also supports the read/write head and rides or "flies" above the disk surface. The NFT couples light onto the media at a spot of a size that is smaller than the optical diffraction limit, which heats a region of the media.

To write data, a magnetic field and heat are simultaneously applied to the area of the magnetic recording medium in which data is to be written. As a result, the temperature of the area increases and the coercivity decreases, thereby enabling the data to be written at a relatively modest field. In order to prevent unintended writing or erasing, the spot diameter of irradiated light should approximately match the size of a recorded bit.

A drawback of a NFT that generates near-field light by direct irradiation with light is the low efficiency of transformation of the applied light into near-field light. Most of the energy of the light applied to the NFT is lost, either by reflecting off the surface of the NFT or by being transformed into thermal energy and absorbed by the NFT. Because the NFT is small in volume, the temperature of the NFT can increase significantly when it absorbs the thermal energy. This temperature increase can cause the NFT to expand in volume and/or deform.

There is, therefore, a continuing need for improved NFT designs that control NFT deformations better than prior-art designs.

SUMMARY

Disclosed herein are heat-assisted magnetic recording (HAMR) devices including NFTs with novel architectures. In some embodiments, a HAMR device comprises a waveguide and a NFT coupled to the waveguide in a direct-fire configuration. The NFT comprises an insulator core encased in a metal portion, the metal portion comprising a plasmonic metal. In some embodiments, the insulator core comprises a rectangular portion and a tapered portion, where the rectangular portion resides between the waveguide and the tapered portion. The insulator core may comprise any suitable material, such as, for example, silicon dioxide, aluminum oxide, silicon carbide, silicon nitride, tantalum pentoxide, diamond-like carbon, boron nitride, aluminum nitride, or beryllium oxide. The plasmonic metal may be any suitable plasmonic metal, such as, for example, gold, silver, aluminum, copper, platinum, a gold alloy, a silver alloy, an aluminum alloy, a copper alloy, or a platinum alloy. In some embodiments, the metal portion includes a layered structure comprising at least one of gold, silver, aluminum, copper, platinum, a gold alloy, a silver alloy, aluminum alloy, copper alloy, or platinum alloy.

In some embodiments, the HAMR device also includes a light source coupled to the waveguide. The light source is configured to produce light having a selected wavelength, and the waveguide comprises a material configured to propagate light having the selected wavelength. For example, the material may be transparent, and/or the material may have a thermal conductivity greater than or equal to the thermal conductivity of silicon dioxide.

In some embodiments, the HAMR device also includes an anti-reflective mechanism between and adjacent to the waveguide and the rectangular portion.

In some embodiments, the size (e.g., dimensions and thickness) of the rectangular portion is configured to induce a plurality of resonant plasmonic modes in the metal portion, and the size (e.g., dimensions and thickness) of the tapered portion is configured to select at least one particular mode of the plurality of resonant plasmonic modes and project the at least one particular mode to an air-bearing surface of the HAMR device. In some embodiments, a first dimension of the rectangular portion is less than approximately 140 nm, and a second dimension of the rectangular portion is less than approximately 150 nm.

In some embodiments, a cross-section of the tapered portion taken perpendicular to the air-bearing surface of the HAMR device in a deposition plane has a shape of an isosceles trapezoid. For example, the base of the isosceles trapezoid may be between approximately 100 nm and approximately 150 nm, a top of the isosceles trapezoid may be between approximately 30 nm and 70 nm, and a height of the isosceles trapezoid may be between approximately 30 nm and 70 nm.

In some embodiments, the thickness of the insulator core is between approximately 10 nm and 25 nm.

In some embodiments, the HAMR device includes additional layers, which may comprise an insulator or a semimetal selected to improve the efficiency of the NFT. For example, the HAMR device may include a first additional layer offset from the insulator core by a first distance in the down-track direction. The first additional layer may be, but is not required to be, recessed from the air-bearing surface of the HAMR device. The first additional layer may be tapered near the air-bearing surface of the HAMR device.

In some embodiments, the HAMR device includes a second additional layer offset from the first additional layer by a second distance in the down-track direction. Like the first additional layer, the second additional layer may be, but is not required to be, recessed from the air-bearing surface of the HAMR device. In some embodiments, the second additional layer is recessed further from the ABS than the first layer. The second additional layer may be tapered near the air-bearing surface of the HAMR device.

In some embodiments, to mitigate heat-induced deformation of the NFT, the NFT further comprises a hard jacket surrounding at least part of the metallic portion. The hard jacket may comprise a hard metal (e.g., tungsten, chromium, etc.) or a dielectric material.

BRIEF DESCRIPTION OF THE DRAWINGS

Objects, features, and advantages of the disclosure will be readily apparent from the following description of certain embodiments taken in conjunction with the accompanying drawings in which:

FIG. 3A is a perspective drawing illustrating a portion of a HAMR device in accordance with some embodiments.

FIG. 3B illustrates an example layered-structure metal portion of a NFT in accordance with some embodiments.

FIG. 3C illustrates the portion of the HAMR device shown in FIG. 3A with the metal portion made translucent to show the geometry of the insulator core.

FIG. 3D is a cross-section of the insulator core of FIG. 3C in a deposition plane.

FIG. 7A illustrates a NFT in accordance with some embodiments.

FIG. 7B is an ABS view of the NFT of FIG. 7A.

FIG. 7C illustrates a NFT in which part of the metal portion near the ABS 160 has been replaced by a hard jacket in accordance with some embodiments.

FIG. 7D is an ABS view of the NFT of FIG. 7C.

FIG. 7E illustrates an embodiment of a NFT in accordance with some embodiments.

FIG. 7F is an ABS view of the NFT of FIG. 7E.

FIG. 7G is a side view of the NFT of FIG. 7F.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim or claims.

Figure 1:
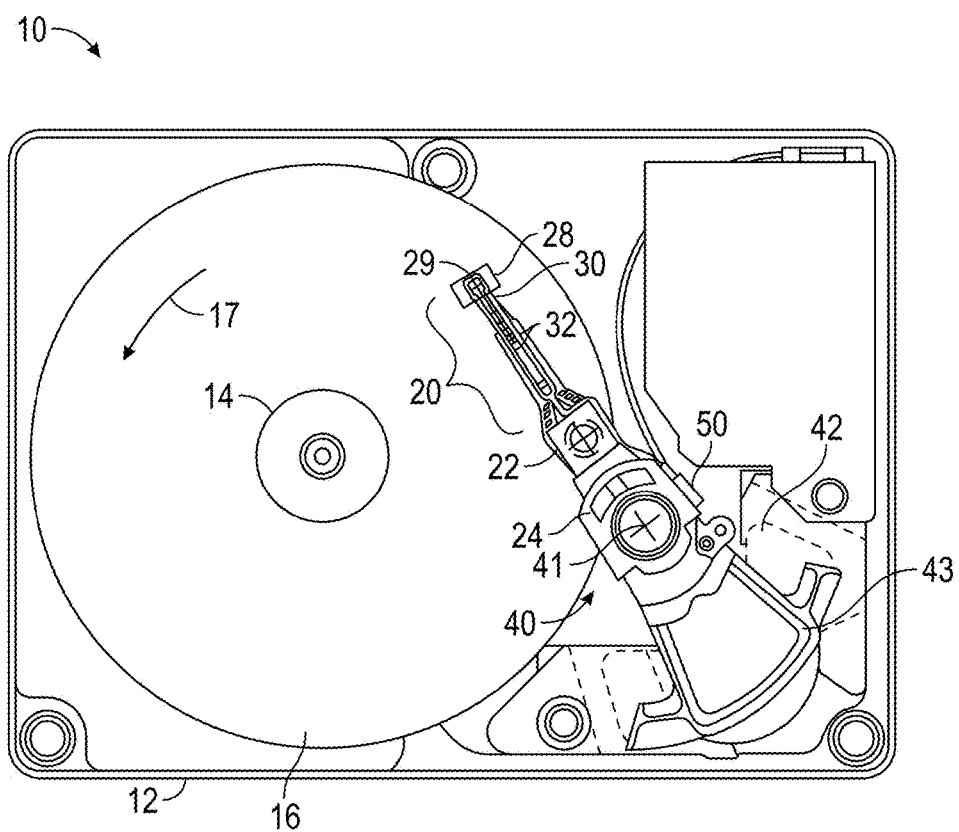
FIG. 1 illustrates a magnetic storage device that may incorporate various of the embodiments disclosed herein.

FIG. 1 is a top view of a head/disk assembly of a hard disk drive 10 with the cover removed. The disk drive 10 is an example of a data storage device that may include one or more of the embodiments disclosed herein. The disk drive 10 includes a rigid base 12 supporting a spindle 14 that supports at least one disk 16. The spindle 14 is rotated by a spindle motor (not shown), which, in operation, rotates the at least one disk 16 in the direction shown by the curved arrow 17. The hard disk drive 10 has at least one load beam assembly 20 having an integrated lead suspension (ILS) or flexure 30 with an array 32 of electrically conductive interconnect traces or lines. The at least one load beam assembly 20 is attached to rigid arms 22 connected to an E-shaped support structure, sometimes called an E-block 24. The flexure 30 is attached to an air-bearing (or, in the case that helium or another gas is used instead of air inside the disk drive, a gas-bearing) slider 28. A magnetic recording read/write head 29 is located at the end or trailing surface of slider 28. The flexure 30 enables the slider 28 to "pitch" and "roll" on an air (or gas) bearing generated by the rotating disk 16.

The disk drive 10 also includes a rotary actuator assembly 40 rotationally mounted to the rigid base 12 at a pivot point 41. The actuator assembly 40 may include a voice coil motor (VCM) actuator that includes a magnet assembly 42 fixed to the base 12 and a voice coil 43. When energized by control circuitry (not shown), the voice coil 43 moves and thereby rotates E-block 24 with attached arms 22 and the at least one load beam assembly 20 to position the read/write head 29 over the data tracks on the disk 16. The trace interconnect array 32 connects at one end to the read/write head 29 and at its other end to read/write circuitry contained in an electrical module or chip 50, which, in the exemplary disk drive 10 of FIG. 1, is secured to a side of the E-block 24. The chip 50 includes a read/write integrated circuit (R/W IC).

As the disk 16 rotates, the disk 16 drags air under the slider 28 and along the air-bearing surface (ABS) of the slider 28 in a direction approximately parallel to the tangential velocity of the disk 16. As the air passes under the ABS, air compression along the air flow path causes the air pressure between the disk 16 and the ABS to increase, which creates a hydrodynamic lifting force that counteracts the tendency of the at least one load beam assembly 20 to push the slider 28 toward the disk 16. The slider 28 thus flies above the disk 16 but in close proximity to the surface of the disk 16.

The slider 28 supports a read/write head 29, which in at least some of the embodiments disclosed herein is a HAMR head that includes an inductive write head, the NFT, and an optical waveguide. (As stated previously, the term "HAMR" as used herein refers to all variants of thermally-assisted recording, including TAMR, EAMR, and HAMR.) A semiconductor laser with a wavelength (for example, of 780 to 980 nm) may be used as the HAMR light source. The laser may be supported on the top of the slider 28, or it may be located on the flexure 30 and coupled to the slider 28 by an optical channel. As the disk 16 rotates in the direction of the arrow 17, the movement of the actuator assembly 40 allows the HAMR head on the slider 28 to access different data tracks on the disk 16. The slider 28 is typically formed of a composite material, such as a composite of alumina/titanium-carbide ($Al_2O_3$/TiC). FIG. 1 illustrates only one disk 16 surface with associated slider 28 and read/write head 29, but there may be multiple disks 16 stacked on a hub that is rotated by a spindle motor, with a separate slider 28 and read/write head 29 associated with each surface of each disk 16.

In operation, after the voice coil 43 has positioned the read/write head 29 over the data tracks on the disk 16, the read/write head 29 may be used to write information to one or more tracks on the surface of the disk 16 and to read previously-recorded information from the tracks on the surface of the disk 16. The tracks may comprise discrete data islands of magnetizable material (e.g., bit-patterned media), or the disk 16 may have a conventional continuous magnetic recording layer of magnetizable material. Processing circuitry in the hard drive 10 (e.g., on the chip 50) provides to the read/write head 29 signals representing information to be written to the disk 16 and receives from the read/write head 29 signals representing information read from the disk 16.

To read information from the disk 16, the read/write head 29 may include at least one read sensor. The read sensor(s) in the read/write head 29 may include, for example, one or more giant magnetoresistance (GMR) sensors, tunneling magnetoresistance (TMR) sensors, or another type of magnetoresistive sensor. When the slider 28 passes over a track on the disk 16, the read/write head 29 detects changes in resistance due to magnetic field variations recorded on the disk 16, which represent the recorded bits.

Figure 2:
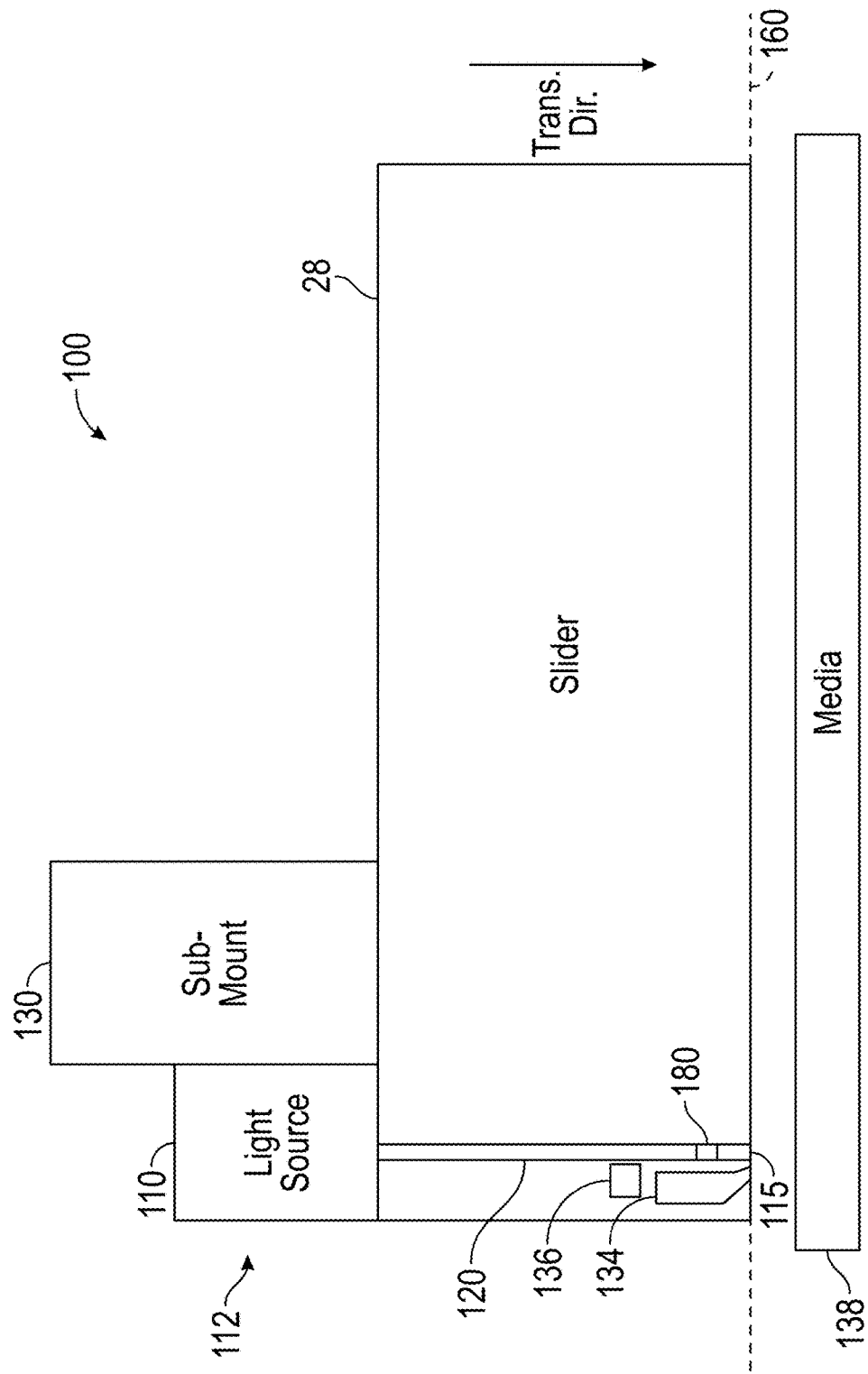
FIG. 2 is a side view of an exemplary embodiment of a HAMR device.

FIG. 2 illustrates an exemplary embodiment of a heat assisted magnetic recording (HAMR) device 100 that may incorporate the NFT embodiments disclosed herein. For simplicity, not all portions of the HAMR device 100 are shown. In addition, although the HAMR device 100 is depicted in the context of particular components, other and/or different components may be used. For simplicity, only single components are shown, but, in general, multiples of the component(s) and/or their sub-component(s) might be used. Furthermore, although the HAMR device 100 is described in the context of hard disk drives (e.g., the hard disk drive 10 of FIG. 1), the embodiments disclosed herein may be used in connection with other types of data storage devices.

The HAMR device 100 includes a slider 28 and a light-source subassembly 112. Additional and/or different components may be included in the HAMR device 100. The slider 28 and the light-source subassembly 112 are generally attached to a suspension (not shown in FIG. 2, but discussed in the explanation of FIG. 1). The HAMR device 100 has an air-bearing surface (ABS) 160 that is proximate to and faces the media 138 (e.g., one or more disks 16) during use.

In general, the HAMR device 100 includes a write transducer and a read transducer. For clarity, however, only components associated with writing are shown. The HAMR device 100 includes a NFT 115, a write pole 134, coil(s) 136, and a waveguide 120. The embodiment of FIG. 2 also includes an optional antireflective mechanism 180. In other embodiments, different, fewer, and/or additional components may be used in the HAMR device 100. As a specific example of how embodiments may differ from FIG. 2, embodiments need not include the optional antireflective mechanism 180.

The write pole 134 includes a portion that faces the media 138. In the embodiment shown, this portion of the write pole 134 is at the ABS 160 and is used to magnetically write data to the media 138. For simplicity, only one turn of one coil 136 is shown. In practice, multiple turns are typically used. In addition, multiple coils may be used. The coil 136 may be a helical coil (having its turns wound around the pole 134) or a spiral coil (having its turns residing completely on one side of the pole 134). A write current driven through the coil 136 is used to energize the pole 134.

The light-source subassembly 112 includes a light source 110 and a submount 130. An optional photodetector (not shown) may also be present. The light source 110 is coupled to the waveguide 120, either directly or through one or more intervening elements, and may be configured to produce light having a selected wavelength. The light source 110 may emit light within a range of, for example, 375 nm to 1.7 μm. The light source 110 may be, for example, an edge emitting laser diode (e.g., of InP type, GaAs type, GaN type, or the like, such as used in applications such as communications, optical disc storage, and material analysis) or other type of laser.

The light-source subassembly 112 is generally affixed to the back side (the side opposite the ABS 160) of the slider 28. Other locations for the light-source subassembly 112 are possible. The submount 130 may be, for example, a substrate to which the light source 110 may be affixed for mechanical stability and ease of integration with the slider 28. If present, the photodetector may be used to sample the light provided from the light source 110. Thus, the light source 110 may be controlled via feedback obtained from the photodetector. Other configurations are possible.

The waveguide 120 is optically coupled with the light source 110 and NFT 115, which resides at or near the ABS 160. The waveguide 120 includes a waveguide core and waveguide cladding. The waveguide 120 may be made from any suitable material that propagates light of a selected wavelength or range of wavelengths (i.e., one or more of the wavelength(s) of light emitted by the light source 110). For example, the waveguide may be polymer, quartz fiber, or plastic fiber. The material of the waveguide 120 may be transparent. In some embodiments, the material making up the waveguide 120 has high thermal conductivity. For example, the thermal conductivity of the waveguide 120 material may be greater than or equal to the thermal conductivity of silicon dioxide (e.g., typically approximately 1.1-1.5 W/m-K). The waveguide 120 may include multiple components (e.g., a core and cladding, multiple physical components, etc.) and/or may have a geometry that is configured for a particular function. For example, tapered sections, inverse tapered sections, mode converter(s), and/or light concentrating sections may be included within the waveguide 120, as disclosed, for example, in U.S. Pat. No. 9,484,051 to Krichevsky et al., the entirety of which is hereby incorporated by reference.

The waveguide 120 carries light from the light source 110 toward the NFT 115. The light carried by the waveguide 120 is predominantly localized within the waveguide core. Thus, FIG. 2 can be considered to illustrate the waveguide core. The surrounding waveguide cladding may carry an exponentially-decaying tail portion of the light, however.

The NFT 115 is optically coupled with the waveguide 120. As shown in FIG. 2, the NFT 115 is in the transmission direction from the waveguide 120. Stated differently, the NFT 115 is aligned with the core of the waveguide 120, and the waveguide 120 and NFT 115 are said to be in a "direct-fire configuration" because the NFT 115 is aligned with the core of the waveguide 120 in the direction of transmission of the light. The localized light within the core of the waveguide 120 excites the plasmons in the NFT 115. Because the NFT 115 is aligned with the waveguide core (i.e. in the transmission direction for part of the energy carried by the waveguide 120), the coupling between the waveguide 120 and the NFT 115 may have improved efficiency. Thus, fewer losses may result.

It is to be understood that the waveguide 120 and the NFT 115 need not be in contact with each other to be in a direct-fire configuration. One example of an element that can be disposed between the waveguide 120 and the NFT 114 is a microdisk focusing element, such as disclosed in U.S. Pat. No. 9,484,051, the contents of which are hereby incorporated by reference in their entirety. As another example of an element that can be disposed between the waveguide 120 and the NFT 115, FIG. 2 illustrates that the HAMR device 100 may include an optional antireflective mechanism 180 situated between the waveguide 120 and the NFT 115. If present, the optional antireflective mechanism 180 may diminish reflected light from traveling back toward the light source 110. Ideally, the antireflective mechanism 180 eliminates reflections altogether. The optional antireflective mechanism 180 may be, for example, a dielectric trench located within the waveguide 120. The dielectric trench is so termed because it may be fabricated by forming a trench and refilling the trench with the dielectric. Reflected light traveling back toward the light source 110 (in the opposite direction of the transmission direction shown in FIG. 2) may cross into the dielectric trench and be again reflected in the direction of transmission at the transition between the dielectric trench and the waveguide 120. Note that some light is transmitted while other light is reflected at this transition. The (twice) reflected light may be reflected from the other interface between the dielectric trench and the waveguide 120. A part of the light is also transmitted through the interface. This (thrice) reflected light again travels toward the light source 110. This multiple reflection/transmission process may be mathematically described. Based on this mathematical model, the thickness of the dielectric trench for the antireflective mechanism 180 and index of refraction for the dielectric trench may be determined. For example, the antireflective mechanism 180 may be configured such that the thickness of the dielectric trench is an integral number of quarter wavelengths of light plus an integral number of half wavelengths, where the wavelength of light is measured in the antireflective mechanism 180. In some such embodiments, the desired index of refraction of the dielectric trench may be a geometric mean of the indices of refraction of the materials surrounding the dielectric trench at the interfaces. Other configurations, other materials and/or other indices of refraction may be used. Thus, the antireflective mechanism 180 may diminish or remove reflected light from traveling back toward the light source 110.

In FIG. 2, the optional antireflective mechanism 180 is shown as residing between the waveguide 120 and the NFT 115, but, if present, the antireflective mechanism 180 could be at another location. For example, the antireflective mechanism 180 might be incorporated in the waveguide 120, incorporated in the NFT 115, or it may be at another location. Although a single antireflective mechanism 180 is shown, in principle multiple antireflective mechanisms 180 might be used. The antireflective mechanism 180 may, for example, be a dielectric having a different index of refraction than surrounding structures. As another example, the antireflective mechanism 180 may be a metal, a grating, or another component(s) that causes light reflected back toward the light source 110 to destructively interfere. In general, the geometry and material(s) of the antireflective mechanism 180 may be determined using optical theory. Furthermore, the antireflective mechanism 180 may be a mechanism other than a dielectric trench.

In operation, the light from the light source 110 is transmitted to the waveguide 120. The light propagates through the waveguide 120 and couples into the NFT 115. Instead of primarily through an evanescent coupling, light concentrated in the core of the waveguide 120 couples directly into the NFT 115 to excite plasmons in the NFT 115. This is termed direct-fire (or simply "direct") coupling. It is to be understood that, as explained above, the waveguide 120 and the NFT 115 may be adjacent to (i.e., touching) each other, or there may be intervening elements (e.g., the optional antireflective mechanism 180) between the waveguide 120 and the NFT 115.

Therefore, in a direct-fire configuration, light localized in the core of the waveguide 120 may be directly fired at the NFT 115 (possibly through an antireflective mechanism 180, as explained above). The NFT 115 transfers energy to the media 138 in a desired region. As a result, the desired portion of the media 138 may be heated. One or more coils 136 energize the pole 134, which writes to the desired portion of the media 138. Reflections caused by the boundary between the waveguide 120 and the NFT 115 may be mitigated (e.g., reduced or eliminated) by including an optional antireflective mechanism 180. If present, the antireflective mechanism 180 resides in the optical path between the light source 110 and the media 138. The antireflective mechanism 180 is configured to reduce or eliminate reflected light in the optical path between the light source 110 and the media 138. Thus, the antireflective mechanism 180 may be included to mitigate issues that arise due to reflections in the light traveling from the light source 110 to the NFT 115.

Figure 3E:
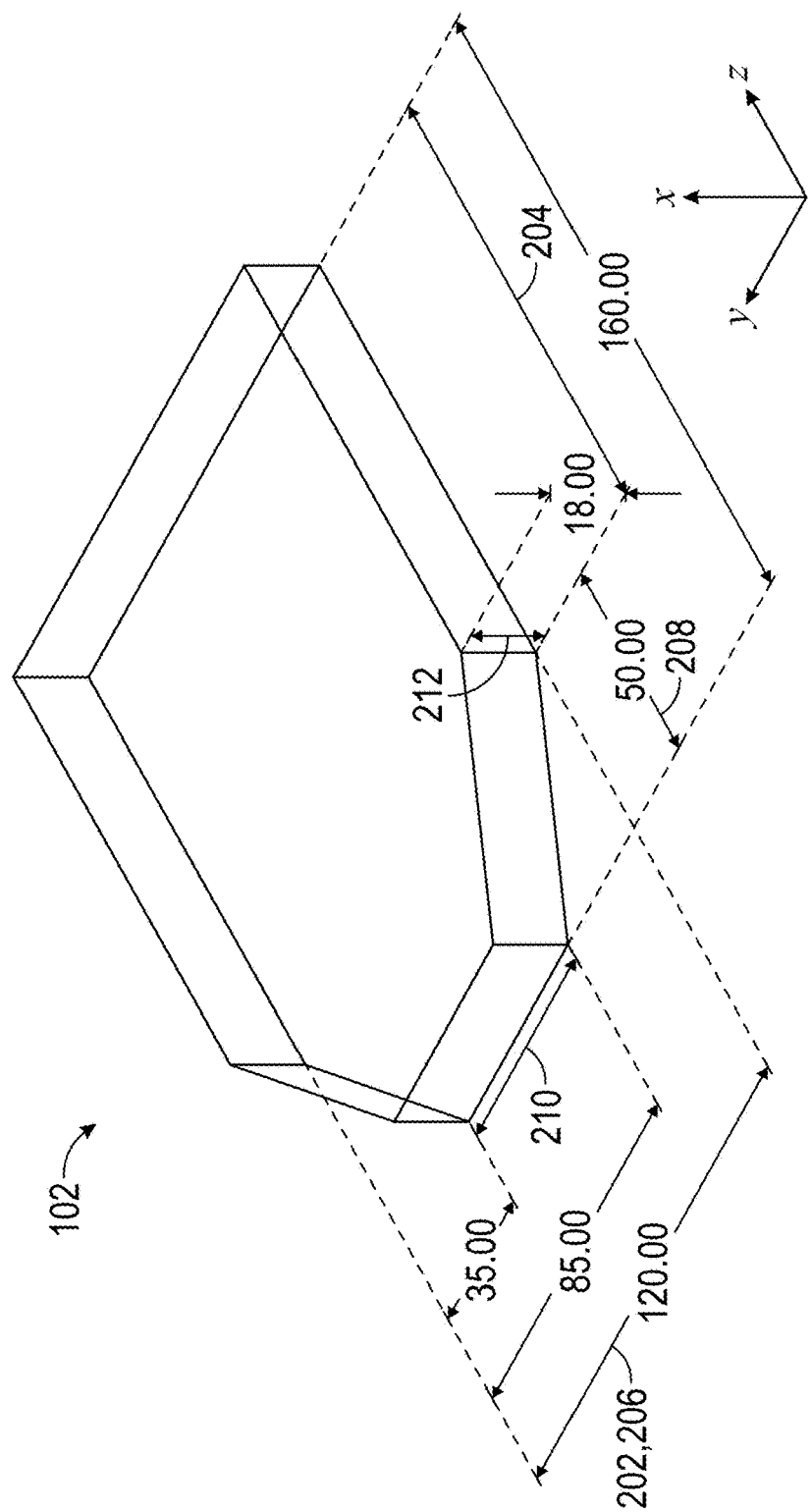
FIG. 3E is a perspective view of the insulator core of FIG. 3C.

When the HAMR device 100 includes one or more of the innovations disclosed herein, it may have improved performance relative to prior-art HAMR devices. FIGS. 3A through 3G are drawings illustrating a portion of a HAMR device 100 in accordance with some embodiments. FIG. 3A is a perspective drawing illustrating a HAMR device 100. FIG. 3A shows a portion of the waveguide core 122 adjacent to a novel NFT 115 (i.e., without the optional antireflective mechanism 180). Also shown are x, y, and z-axes to assist in the description of the components of the HAMR device 100. The ABS 160 of the HAMR device 100 is in the x-y plane. The y-z plane, and planes parallel to it, are the deposition planes. When the HAMR device 100 is incorporated into a hard disk drive 10, the down-track direction is in the x (or −x) direction, and the cross-track direction is in the y (or −y) direction.

The NFT 115 includes an insulator core 102. FIG. 3A illustrates the tip of the insulator core in the x-y plane, which is at the ABS 160 of the HAMR device 100, facing the media 138 when installed in a data storage device (e.g., the hard disk drive 10). In alternative embodiments, the tip of the insulator core may be recessed from the ABS 160. The insulator core 102 comprises an insulator, such as, for example, silicon dioxide (SiO$_2$), aluminum oxide (Al$_2$O$_3$), silicon carbide (SiC), silicon nitride (Si$_3$N$_4$), tantalum pentoxide (Ta$_2$O$_5$), diamond-like carbon (DLC), boron nitride (BN), aluminum nitride (AlN), or beryllium oxide (BeO).

The insulator core 102 is encased in a metal portion 104. As illustrated in FIG. 3A, the metal portion also extends to the ABS 160, but it may extend only part-way to the ABS 160 (e.g., it may be recessed). It is to be understood that the metal portion includes both cuboid elements shown in FIG. 3A, i.e., the larger portion abutting the waveguide core 122 and the smaller portion extending from the larger portion. The metal portion 104 comprises a conductive material, such as a plasmonic metal. The metal portion 104 may comprise, for example, a pure plasmonic metal, an alloy of two or more plasmonic metals, or an alloy of a plasmonic metal and a non-plasmonic metal. Plasmonic metals include, for example, gold (Ag), palladium (Pd), platinum (Pt), rhodium (Rh), iridium (Ir), ruthenium (Ru), silver (Au), copper (Cu), and aluminum (Al).

In some embodiments, the metal portion 104 comprises a layered structure comprising one or more of gold (Ag), palladium (Pd), platinum (Pt), rhodium (Rh), iridium (Ir), ruthenium (Ru), silver (Au), copper (Cu), aluminum (Al), or an alloy of any one or more of these materials. FIG. 3B illustrates an example layered portion 104A comprising a layered structure 105. As shown in FIG. 3B, the layers 141A, 141B, 141C, 141D, 141E, and 141F of the layered structure 105 may have different thicknesses. The layered structure 105 may include alternating layers of two plasmonic metals or alloys containing at least one plasmonic metal. The layered structure 105 may include more than two plasmonic metals or alloys thereof. Although FIG. 3B illustrates a layered structure 105 with six layers 141A, 141B, 141C, 141D, 141E, and 141F, the number of layers may be greater than or less than six. For example, the layered structure 105 may have as few as two layers 141.

FIG. 3C illustrates the portion of the HAMR device 100 shown in FIG. 3A, but with the metal portion 104 made translucent to show the geometry of the insulator core 102. As shown in FIG. 3C, the insulator core 102 is adjacent to the waveguide core 122. In some embodiments, an antireflective mechanism 180 (not shown) is disposed between the waveguide core 122 and the NFT 115 (and thereby the insulator core 102).

Figure 3G:
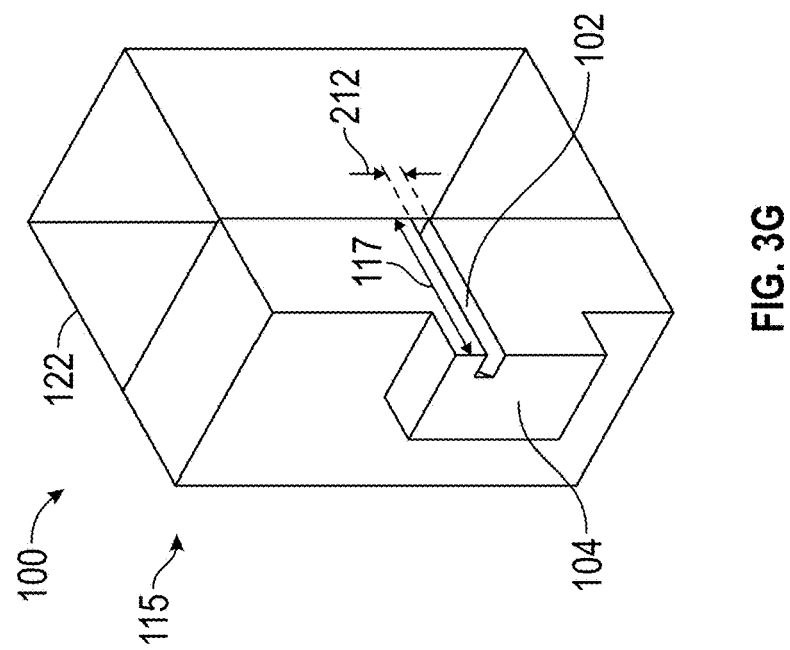
FIG. 3G is a perspective view of another cross section of the HAMR device of FIG. 3A.
Figure 3F:
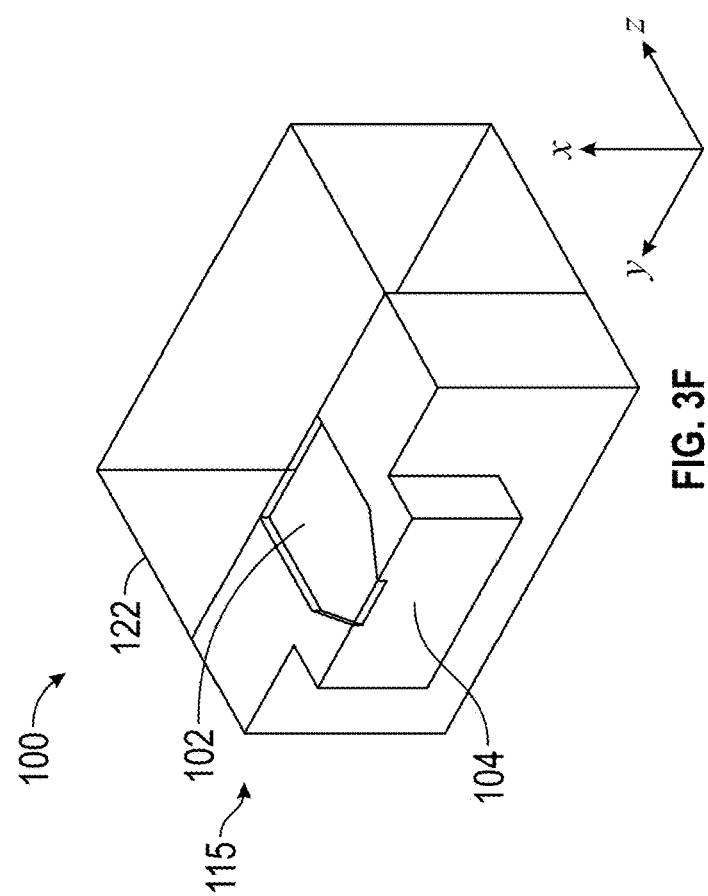
FIG. 3F is a perspective view of a cross-section of the HAMR device of FIG. 3A.

FIG. 3D is a cross-section 200 of the insulator core 102 of FIG. 3C in a deposition plane (i.e., parallel to the y-z plane). FIG. 3E is a perspective view of the insulator core 102 alone. FIG. 3F is a perspective view of the cross-section 200 of the insulator core 102 in place in the HAMR device 100. FIG. 3G is a perspective view of a cross section 201 of the HAMR device 100 through the center of the insulator core 102 in a plane parallel to the x-z plane. As shown in FIGS. 3E and 3G, the insulator core 102 has a thickness 212. As shown in FIGS. 3C, 3D, and 3E, the insulator core 102 has a structure that can be described as the union of a rectangular portion 102A and a trapezoidal portion 102B. The rectangular portion 102A has a width 202, a height 204, and the thickness 212. The dimensions (i.e., width 202, height 204, and thickness 212) are selected so that the rectangular portion 102A sets up nodal points of energy for selection by the trapezoidal portion 102B. Stated another way, the size of the rectangular portion 102A is configured to induce a plurality of resonant plasmonic modes in the metal portion 104 of the NFT 115. Thus, the rectangular portion 102A is a resonator structure.

The trapezoidal portion 102B illustrated in FIG. 3D is an isosceles trapezoid in the deposition-plane cross-section 200 and has a base length 206, a height 208, and a top length 210. As shown in FIGS. 3E and 3G, the trapezoidal portion 102B also has the thickness 212. The base length 206, height 208, top length 210, and thickness 212 of the trapezoidal portion 102B are chosen so that the trapezoidal portion 102B selects one or more of the modes set up by the rectangular portion 102A and projects the one or more modes to the surface of the media opposite the NFT 115. In other words, the size of the trapezoidal portion 102B is configured to select at least one particular mode of the plurality of resonant plasmonic modes and project the at least one particular mode to the ABS 160 of the HAMR device 100. Although FIG. 3D illustrates an insulator core 102 in which the base length 206 of the trapezoidal portion 102B is substantially equal to the width 202 of the rectangular portion 102A, the base length 206 does not necessarily have to be equal to width 202.

FIG. 3E provides exemplary dimensions for the width 202, height 204, and thickness 212 of the rectangular portion 102A and the base length 206, height 208, top length, and thickness 212 of the trapezoidal portion 102B in accordance with some embodiments. In the embodiment illustrated, the width 202 is approximately 120 nm, and the height 204 is approximately 110 nm. The base length 206 is approximately 120 nm, the height 208 is approximately 50 nm, and the top length 210 is approximately 50 nm. The thickness 212 is approximately 18 nm, and the overall length 117 of the insulator core 102 is approximately 160 nm. It is to be understood that the dimensions shown in FIG. 3E are exemplary of one embodiment, and different dimensions may be chosen. The appropriate dimensions, and therefore the sizes and thicknesses of the rectangular and trapezoidal portions 102A, 102B will depend on the materials used in the HAMR device 100 (e.g., the materials selected for the insulator core 102 and the metal portion 104). Compactness of the design is desirable in some applications. Therefore, in some embodiments, the width 202 is less than approximately 140 nm, and the height 204 of the rectangular portion is less than approximately 150 nm. In some embodiments, the base length 206 is between approximately 100 nm and approximately 150 nm, the height 208 is between approximately 30 nm and approximately 70 nm, and the top length 210 is between approximately 30 nm and approximately 70 nm. In some embodiments, the thickness 212 of the insulator core 102 (i.e., the height of the insulator core in the down-track direction) is between approximately 10 nm and approximately 25 nm.

As shown in FIG. 3E, the insulator core 102 may be offset from the center of the metal portion 104 in the x-direction. The offset may be selected to optimize the distance of maximum heating to the magnetic write pole 134.

As stated, FIGS. 3C and 3D illustrate a trapezoidal portion 102B that has a cross-section in the shape of an isosceles trapezoid in the deposition plane. It is to be understood that in other embodiments, the trapezoidal portion 102B may have a non-isosceles trapezoid in the deposition plane. It is also to be understood that although FIG. 3D illustrates that the width 202 of the rectangular portion 102A is substantially equal to the base length 206 of the trapezoidal portion 102B, this substantial equivalence is not a requirement. The width 202 of the rectangular portion 102A may differ from the base length 206 of the trapezoidal portion 102B. It is also to be understood that although FIG. 3D shows a dashed line between the rectangular portion 102A and the trapezoidal portion 102B, the dashed line serves only to aid in the explanation. In practical implementations in which the insulator core 102 is fabricated using a deposition process, the insulator core 102 is likely to be one monolithic structure, as shown in FIG. 3E.

Figure 3H:
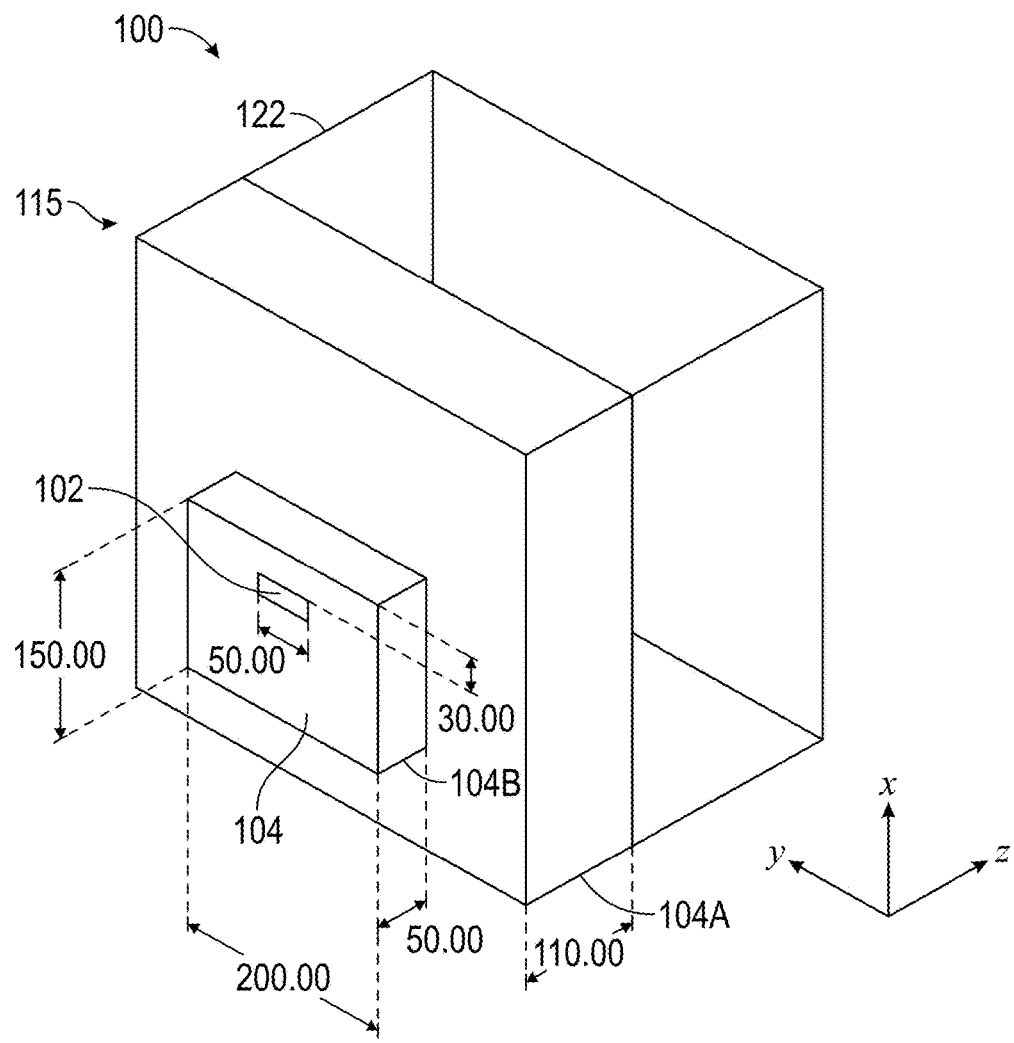
FIG. 3H provides exemplary dimensions for the metal portion of a NFT in accordance with some embodiments.

FIG. 3H provides exemplary dimensions for the metal portion 104 of the NFT 115 in accordance with some embodiments. As shown in FIG. 3H, the metal portion 104 includes a base cuboid portion 104A and a protruding cuboid portion 104B. As shown in FIGS. 3A and 3F, the protruding cuboid portion 104B surrounds the trapezoidal portion 102B of the insulator core 102, and the base cuboid portion 104A surrounds the rectangular portion 102A of the insulator core 102. In the embodiment shown in FIG. 3H, the protruding cuboid portion 104B is approximately 150 nm×50 nm×200 nm, and it is offset from the insulator core 102 in the down-track direction (i.e., the x-direction). It is to be understood that the dimensions of the base cuboid portion 104A, the dimensions of the protruding cuboid portion 104B, and the amount by which the protruding cuboid portion 104B is offset from the insulator core 102 (if offset) will depend, at least in part, on the dimensions of the insulator core 102 and the materials selected for the insulator core 102 and the metal portion 104. Moreover, the use of a layered structure 105 and the composition of such a layered structure 105 can affect the dimensions of the base cuboid portion 104A, the dimensions of the protruding cuboid portion 104B, and the amount by which the protruding cuboid portion 104B is offset from the insulator core 102 (if it is offset at all).

Figure 4:
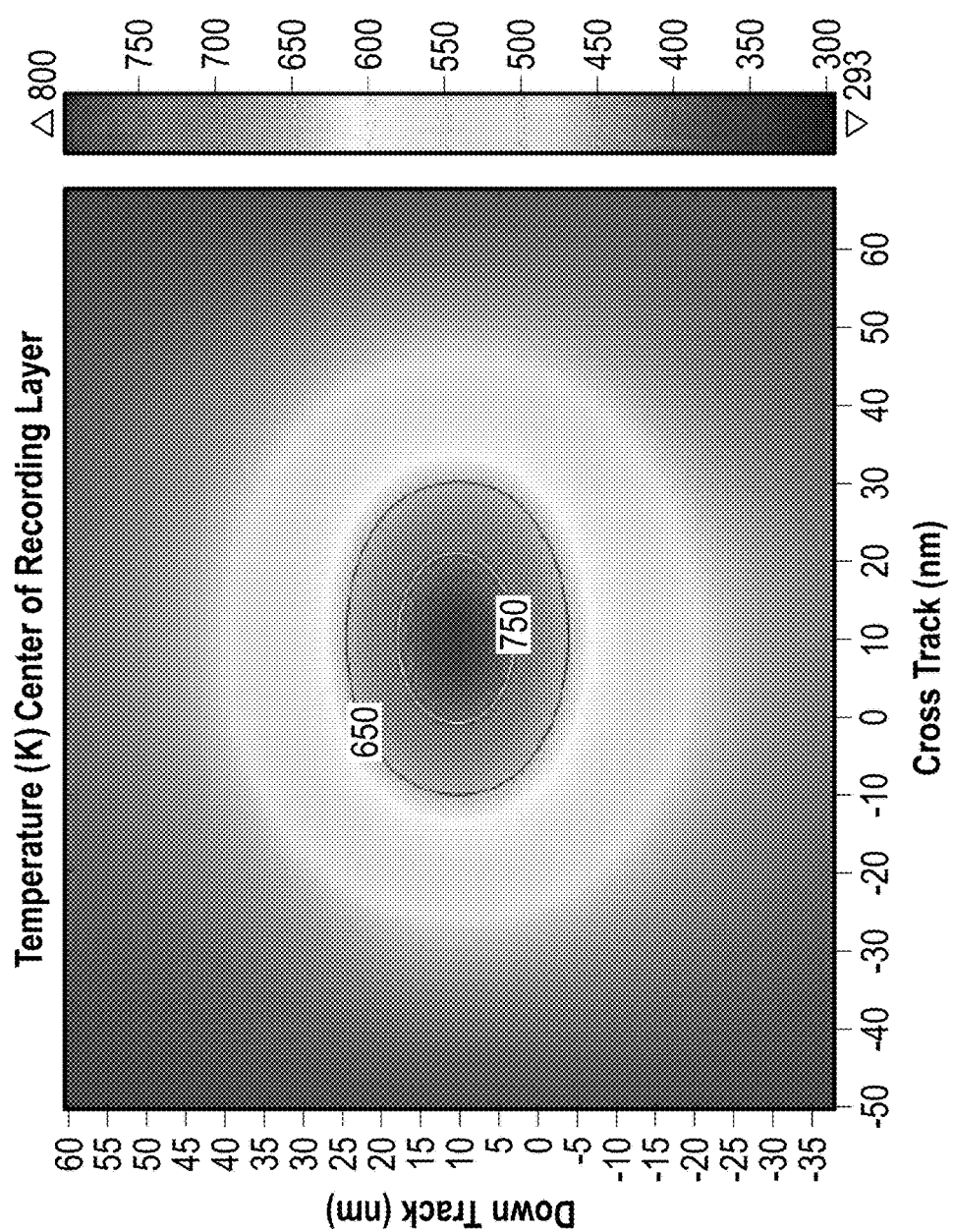
FIG. 4 is a heat map illustrating the thermal spot profile of an exemplary NFT.

FIG. 4 is a heat map illustrating the thermal spot profile of an exemplary NFT 115 when the media temperature reaches 800 K. The thermal spot is ~40×30 nm at 650 K (i.e., the refreezing point). Table A below presents the results of thermal simulations, which confirm the expected efficiency of the NFT 115 heat sinking. The simulation results indicate that both the NFT 115 and the write pole 134 remain relatively cool (~400 K at 9 nm head-media spacing (HMS), reaching ~430 K at 10.5 nm HMS) when the recording layer of the media reaches 800 K. Simulations also indicate good NFT 115 efficiency. The desired media temperature is achieved at ~3.3 mW radiation energy delivered to the NFT 115.

TABLE A

| | Maximum temperature (K) |
|---|---|
| Head carbon overcoat | 651 |
| Lube | 664 |
| Media carbon overcoat | 786 |
| Magnetic recording layer | 800 |
| Media MgO layer | 771 |
| Insulator core 102 | 589 |
| Metal portion 104 | 405 |
| Write pole 134 | 402 |

Figure 5A:
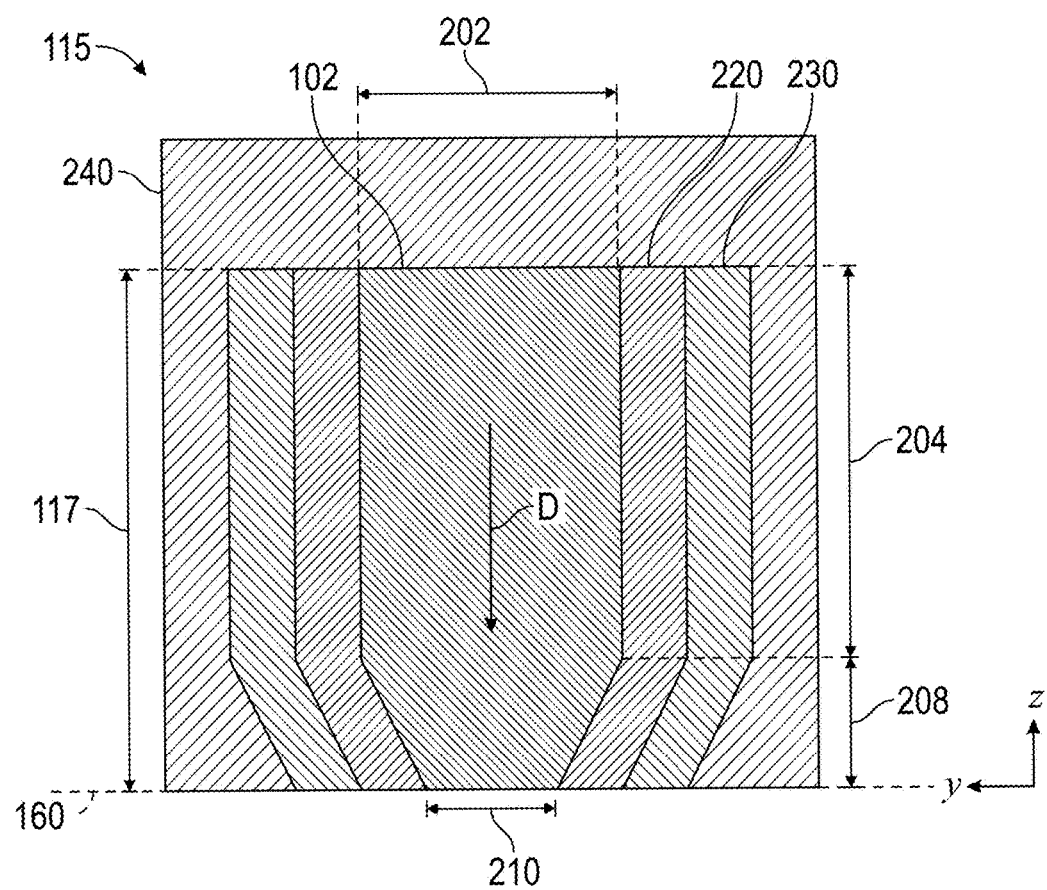
FIG. 5A illustrates a NFT with additional layers in accordance with some embodiments.

In some embodiments, the NFT 115 includes, in addition to the insulator core 102, other layers offset in the down-track direction from the insulator core 102. FIG. 5A illustrates a NFT 115 with additional layers in accordance with some embodiments. The view is from a deposition plane (i.e., the y-z plane or a plane parallel to the y-z plane) but with material (e.g., the metal portion 104) between the various layers removed (or made transparent) to allow the layers to be seen. If added to FIG. 3C, the additional layers would reside above or below the insulator core 102.

FIG. 5A shows that in addition to the insulator core 102, the NFT 115 includes a first additional layer 220, which is offset from the insulator core 102 by a first distance in the down-track direction (i.e., the x-direction, which is into the page using the axes previously established for the drawings in this application). The first additional layer 220 may comprise a material that promotes evanescent coupling over the length 117 of the NFT 115. For example, the first additional layer 220 may comprise an insulator or a semi-metal. Examples of insulators and semi-metals include silicon dioxide, aluminum oxide, silicon carbide, silicon nitride, tantalum pentoxide, diamond-like carbon, boron nitride, arsenic, antimony, bismuth, alpha-tin, graphite, allotropes of carbon, and conductive polymers.

As illustrated in FIG. 5A, the first additional layer 220 has a shape that is similar to or identical to the shape of the insulator core 102. As used herein, the term "similar to" means that the shape of one element is generally the same as the shape of another element, even if the dimensions of the two similar shapes are not in proportion. Thus, an isosceles triangle is similar to an equilateral triangle because they both have three sides and three angles, even though the corresponding sides are not proportional and the corresponding angles are not the same. Likewise, a rectangle and a square are similar, as are two trapezoids whose bases, heights, and tops are in different proportions. Therefore, it is to be understood that the phrase "similar to" is used more broadly herein than it is in geometry, where, for example, two triangles are said to be similar only if their corresponding angles are congruent and their corresponding sides are in proportion. In this document, two shapes are said to be similar if they have generally the same shapes (e.g., both are rectangular; both are trapezoidal; both have a rectangular portion 102A and a trapezoidal portion 102B; etc.). The shape of the first additional layer 220 is generally the same as the shape of the insulator core 102 because, like the insulator core 102, the first additional layer 220 has a rectangular portion 102A and a trapezoidal portion 102B, even if the sizes and proportions of these elements in the first additional layer 220 are not the same as in the insulator core 102.

FIG. 5A also illustrates a second additional layer 230, which is offset from the first additional layer 220 by a second distance in the down-track direction. The second additional layer 230 has a shape that is similar to or identical to the shape of the first additional layer 220 (and, therefore, similar to or identical to the shape of the insulator core 102). The second additional layer 230 may have a size that "chirps" or "steers" a selected mode in the desired direction while allowing it to couple with a mode traveling in the adjacent layer. Chirping adjusts the mode's momentum and, consequently, the direction in which it travels. The second additional layer 230 may comprise a material that promotes chirped coupling of energy. For example, the second additional layer 230 may comprise an insulator or a semi-metal, examples of which are provided above.

FIG. 5A also illustrates a third additional layer 240, which is offset from the second additional layer 230 by a third distance in the down-track direction. In the embodiment illustrated in FIG. 5A, the third additional layer 240 is rectangular. The third additional layer 240 may have a size that "chirps" or "steers" a selected mode in the desired direction while allowing it to couple with a mode traveling in the adjacent layer. The third additional layer 240 may comprise a material that promotes chirped coupling of energy. For example, the third additional layer 240 may comprise an insulator or a semi-metal, examples of which are provided above.

Figure 5B:
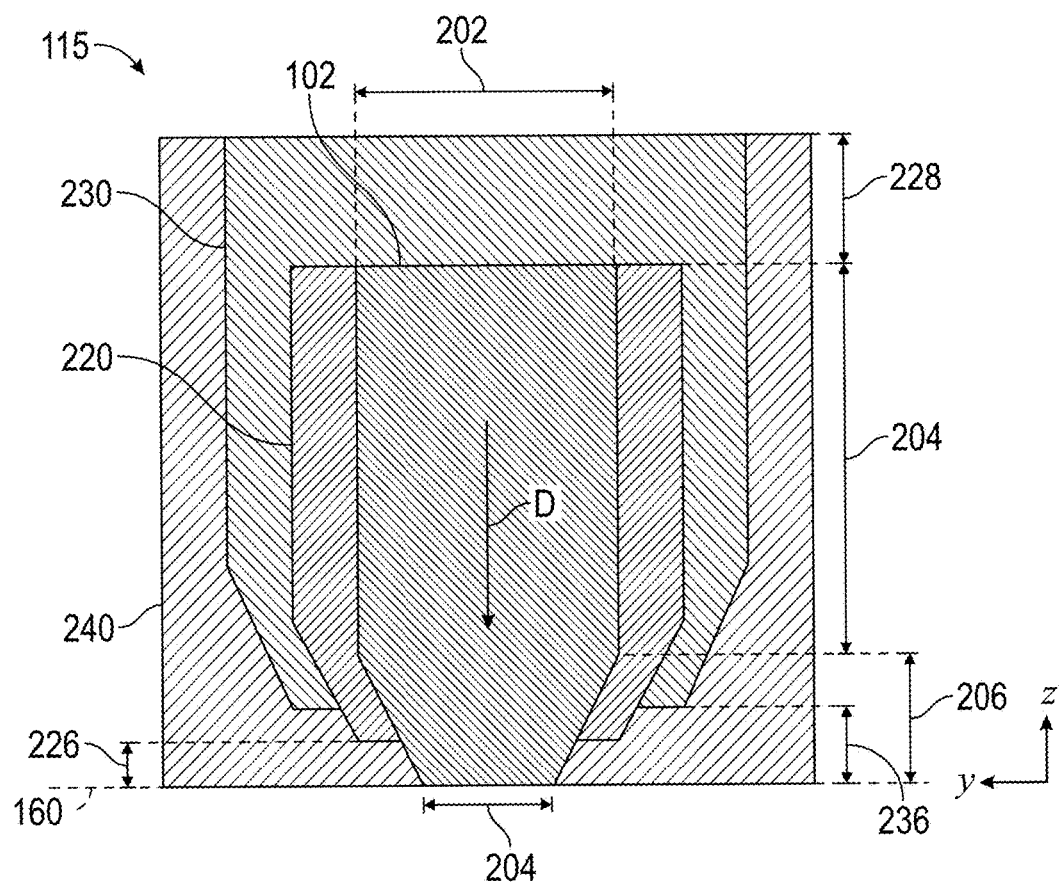
FIG. 5B illustrates another NFT with additional layers, some of which are recessed from the ABS, in accordance with some embodiments.
Figure 6:
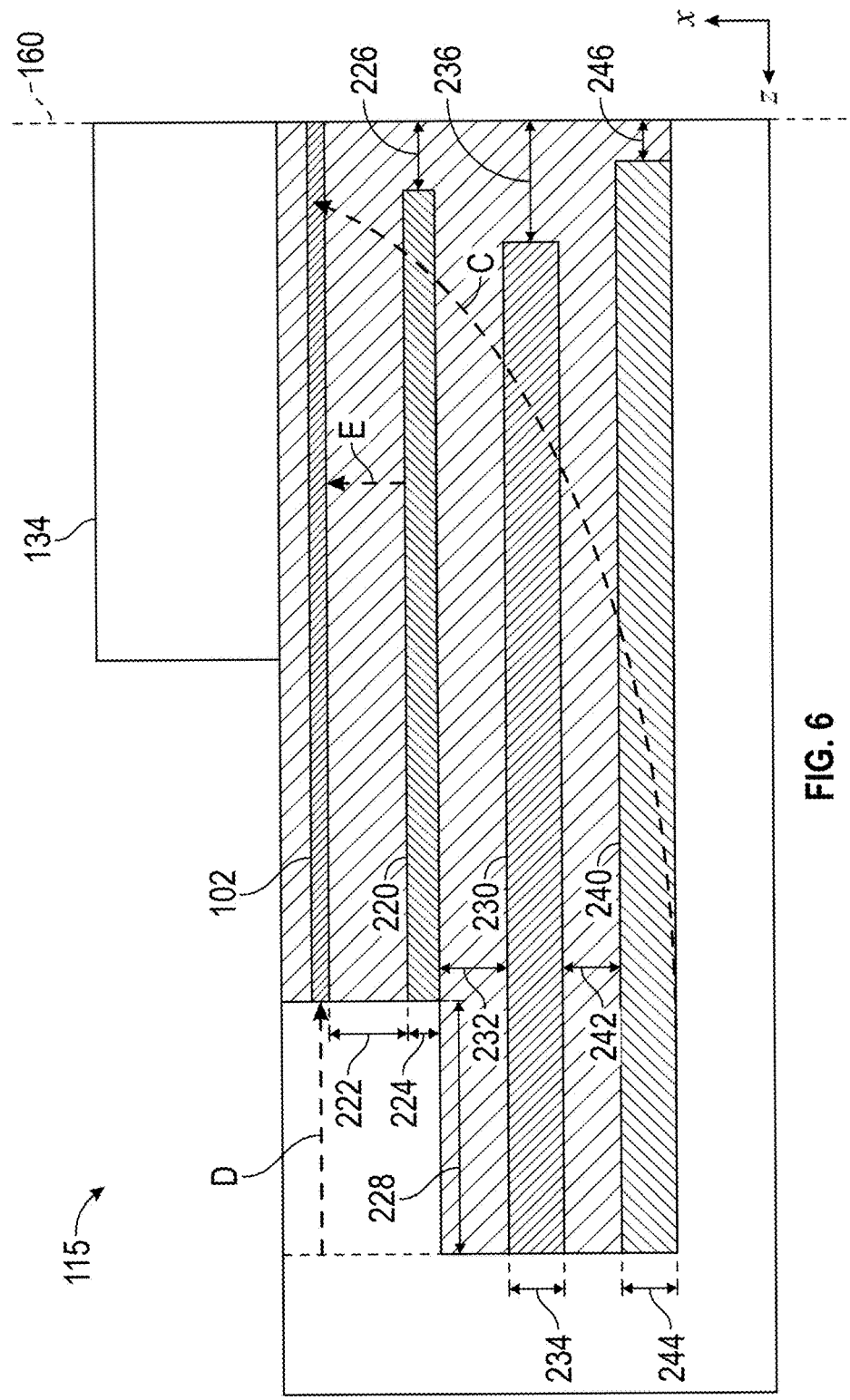
FIG. 6 illustrates a cross-section of a portion of a HAMR device that includes the exemplary NFT of FIG. 5B.

In some embodiments in which the NFT 115 includes additional layers, at least one of the other layers is recessed from the ABS 160. FIG. 5B illustrates another NFT 115 with additional layers, some of which are recessed from the ABS 160, in accordance with some embodiments. FIG. 6 illustrates a cross-section (in a plane parallel to the x-z plane) of a portion of a HAMR device 100 that includes the exemplary NFT 115 of FIG. 5B in a direct-fire configuration so that light couples directly into the NFT 115 (as shown by the arrow labeled "D"). As shown in FIGS. 5B and 6, the NFT 115 includes, in addition to the insulator core 102, a first additional layer 220, which has a thickness 224 and is offset from the insulator core 102 by a distance 222 in the down-track direction. The first additional layer 220 is also recessed from the ABS 160 by a distance 226. In some embodiments, the distance 222, thickness 224, and size and shape of the first additional layer 220 are selected to promote evanescent coupling (represented in FIG. 6 by the dashed arrow labeled "E"). The distance 226 may be selected to reduce reflections from the media.

As in FIG. 5A, the first additional layer 220 may comprise a material that promotes evanescent coupling over the length 117 of the NFT 115 (e.g., the material may be an insulator or semi-metal, examples of which are provided above). As illustrated in the embodiment of FIG. 5B, the first additional layer 220 has a shape that is similar to the shape of the insulator core 102. It is to be understood that the shape of the first additional layer 220 may be a scaled version of the shape of the insulator core 102, in which case the back edge of the first additional layer 220 (i.e., the edge that is distal from the ABS 160) would extend beyond the back edge of the insulator core 102. The material of the first additional layer 220, the distance 222, the thickness 224, and the distance 226 may be determined using computer simulations that are within the capabilities of those skilled in the art.

FIGS. 5B and 6 also illustrate a second additional layer 230, which has a thickness 234, is offset from the first additional layer 220 by a distance 232 in the down-track direction, and is recessed from the ABS 160 by a distance 236. In some embodiments, the distance 232 and the thickness 234 are selected to promote chirped coupling of energy along the length of the NFT 115 (e.g., the distance between the ABS 160 and the leftmost edge of the layer 240). The distance 236 may be selected to prevent energy from being directed toward a region outside the desired heated area within the media. The distances 226 and 236 may be selected (e.g., jointly optimized) to substantially cancel at least one resistive loss with constructive interference.

In the embodiment illustrated in FIG. 5B, the second additional layer 230 has a shape that is similar to or identical to the shape of the first additional layer 220 (and, therefore, similar to or identical to the shape of the insulator core 102). The second additional layer 230 may have a size and shape that "chirps" or "steers" a selected mode in the desired direction while allowing it to couple with a mode traveling in the adjacent layer. The second additional layer 230 may comprise a material that promotes chirped coupling of energy. For example, the second additional layer 230 may comprise an insulator or a semi-metal, examples of which are provided above.

In the embodiments of FIGS. 5B and 6, the back edge (i.e., the edge that is distal from the ABS 160) of the second additional layer 230 extends a distance 228 beyond the back edge of the first additional layer 220. The distance 228 may be selected to reduce back reflection (e.g., provide the benefits of configurations disclosed in U.S. Pat. No. 9,484,051, the entirety of which is incorporated by reference herein). Thus, the second additional layer 230 may function as an offset lip, as described in co-pending U.S. patent application Ser. No. 15/853,768, which is being filed on the same day as this application and is incorporated by reference.

FIGS. 5B and 6 also illustrate a third additional layer 240, which has a thickness 244 and is offset from the second additional layer 230 by a distance 242 in the down-track direction. The third additional layer 240 may extend to the ABS 160 (FIG. 5B), or it may be recessed from the ABS 160 by a distance 246 (FIG. 6). In the embodiment illustrated in FIG. 5B, the third additional layer 240 is rectangular, but it may have a different shape. The third additional layer 240 may have a size (e.g., thickness 244 and physical dimensions) and shape that "chirps" or "steers" a selected mode in the desired direction while allowing it to couple with a mode traveling in the adjacent layer. The third additional layer 240 may comprise a material that promotes chirped coupling of energy. For example, the third additional layer 240 may comprise an insulator or a semi-metal, examples of which are provided above. The distance 246 may be selected to prevent energy from being directed toward a region outside the desired heated area within the media. The distance 246 may be zero, in which case the third additional layer 240 extends to the ABS 160, as shown in FIG. 5B.

Although all of the insulator core 102 and the first and second additional layers 220, 230 are illustrated in FIGS. 5A and 5B as having a rectangular portion 102A and a trapezoidal portion 102B (like the embodiments of FIG. 3), the insulator core 102 and the first and second additional layers 220, 230 may have other geometries (as does the additional layer 240 shown in FIGS. 5A and 5B). Specifically, the insulator core 102 and the first and second additional layers 220, 230 may have any shapes (e.g., sizes, dimensions, etc.) that promote the NFT 115 achieving a desired efficiency level. For example, the insulator core 102 and/or, if present, the additional layers (e.g., 220, 230, 240) may have shapes that are not the union of a rectangular portion 102A and a trapezoidal portion 102B. In addition, although FIGS. 5A and 5B illustrate the insulator core 102 and the first and second additional layers 220, 230 having similar shapes (i.e., they all have a rectangular portion 102A and a trapezoidal portion 102B), the shapes of the first and second additional layers 220, 230 need not be similar to the shape of the insulator core 102 or to each other. For example, the insulator core 102 may have a shape that is similar or identical to the first additional layer 220 but not the second additional layer 230. As another example, the insulator core 102 may have a shape that is similar or identical to the second additional layer 230 but not the first additional layer 220. Furthermore, the insulator core 102 may have a shape that is different from both of the first and second additional layers 220, 230, but the first and second additional layers 220, 230 may have similar shapes. Finally, the insulator core 102, the first additional layer 220, and the second additional layer 230 may all have non-similar shapes. In some embodiments, including the example embodiments illustrated in FIGS. 5A and 5B, the first additional layer 220 and/or the second additional layer 230 is tapered near the ABS 160.

Furthermore, although FIGS. 5A, 5B, and 6 illustrate three additional layers 220, 230, and 240, the number of additional layers may be larger or smaller than three. For example, in some embodiments, only one additional layer is included, and one or more of its characteristics (e.g., material, size, thickness, shape, position relative to the insulator core 202, recess distance from the ABS 160, etc.) are selected to optimize one or more of: evanescent coupling, chirped coupling, reflections toward the light source 110, reflections toward the media, NFT 115 efficiency. Furthermore, the write pole 134 and additional layers may be jointly optimized (e.g., materials, size, geometries, positions, etc.).

In addition, although FIGS. 5B and 6 illustrate some of the additional layers (e.g., additional layers 220 and 230) extending different distances from the ABS 160 (i.e., in the z-direction), some or all of the additional layers may extend the same distances from the ABS 160. In other words, some or all of the additional layers (e.g., 220, 230, 240) may extend to the same point along the z-axis. Alternatively, some or all of the additional layers may extend to different points along the z-axis. As will be appreciated by a person having ordinary skill in the art, the sizes, materials, dimensions, etc. of the additional layers and, if any, the distances by which they are recessed from the ABS 160 are design choices, and these parameters may be optimized to achieve a desired efficiency and/or a level of manufacturability.

Co-pending U.S. application Ser. No. 15/853,768, entitled "METAL-INSULATOR-METAL NEAR-FIELD TRANSDUCER FOR HEAT-ASSISTED MAGNETIC RECORDING" and incorporated by reference herein, discloses a novel NFT architecture to improve NFT reliability without sacrificing performance. The disclosed architecture reduces the amount of plasmonic metal in the NFT and thereby reduces NFT deformation. A portion of the plasmonic metal is replaced by a hard jacket comprising an insulator or a hard metal. The hard jacket encases the plasmonic metal and prevents it from undergoing the types of deformations that tend to limit NFT lifetimes and can cause HAMR device failures.

The architecture disclosed in U.S. application Ser. No. 15/853,768 may be used in conjunction with the architecture disclosed herein. For example, in some embodiments, at least a portion of the metallic portion 104 of the NFT 115 is encased in a hard jacket. FIG. 7A illustrates an embodiment of a NFT 115 that includes an insulator core 102 surrounded by a metal portion 104 as described previously. FIG. 7B is an ABS view of the NFT 115 of FIG. 7A. As shown in FIG. 7B, the NFT 115 is sandwiched between two metal layers 107.

FIG. 7C illustrates an embodiment of a NFT 115 in which part of the metal portion 104 near the ABS 160 has been replaced by a hard jacket 106. FIG. 7D is an ABS view of the NFT 115 of FIG. 7C. As explained in co-pending U.S. application Ser. No. 15/853,768, the hard jacket 106 comprises a material that is both mechanically and thermally stable in the temperature range in which the NFT 115 is expected to operate. The material of the hard jacket 106 may be a hard metal, such as, for example, tungsten or chromium, or it may be a dielectric material (e.g., SiC). In some embodiments, the thickness of the hard jacket 106 is at least 2 nm in the cross-track and down-track directions.

In some embodiments, the thermal expansion coefficient of the hard jacket 106 is lower than the thermal expansion coefficient of the insulator core 102 so that when the temperature of the NFT 115 increases, the hard jacket 106 prevents the metal portion 104 from protruding or deforming significantly, and thus reduces the likelihood of burnishing of the NFT 115. In some embodiments, the thermal expansion coefficient of the insulator core 102 is substantially matched by the thermal expansion coefficient of the combination of the metal portion 104 and the hard jacket 106 so that when the temperature of the NFT 115 increases, the change in size of the metal portion 104 and the hard jacket 106 compensates for or cancels the change in size of the core layer 102, or vice versa. In other words, the thermal expansion coefficients of the core layer 102, the metal portion 104, and the hard jacket 106 interact such that the overall size and structural stability of the NFT 115 remains approximately constant over the entire operating temperature range of the NFT 115.

FIG. 7E illustrates an embodiment of a NFT 115 having an insulator core 102 with a different shape than previously-illustrated embodiments. In particular, the insulator core 102 of FIG. 7E has a shape that is the union of a rectangular portion 102A and a non-isosceles trapezoidal portion 102B. A hard jacket 106 replaces part of the metal portion 104 near the ABS 160. FIG. 7F is an ABS view of the NFT 115 of FIG. 7E, and FIG. 7G is a side view.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

The word "coupled" refers to elements that are connected directly or through one or more intervening elements.

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A heat-assisted magnetic recording (HAMR) device, comprising:
    a waveguide; and
    a near-field transducer (NFT) coupled to the waveguide in a direct-fire configuration, the NFT comprising an insulator core encased in a metal portion, the metal portion comprising a plasmonic metal,
    wherein:
    the insulator core comprises a rectangular portion and a tapered portion, and
    the rectangular portion is between the waveguide and the tapered portion.

2. The HAMR device recited in claim 1, wherein the insulator core comprises silicon dioxide, aluminum oxide, silicon carbide, silicon nitride, tantalum pentoxide, diamond-like carbon, boron nitride, aluminum nitride, or beryllium oxide.

3. The HAMR device recited in claim 1, wherein the plasmonic metal is gold, silver, aluminum, copper, platinum, a gold alloy, a silver alloy, an aluminum alloy, a copper alloy, or a platinum alloy.

4. The HAMR device recited in claim 1, wherein the metal portion includes a layered structure comprising at least one of gold, silver, aluminum, copper, platinum, a gold alloy, a silver alloy, aluminum alloy, copper alloy, or platinum alloy.

5. The HAMR device recited in claim 1, further comprising a light source coupled to the waveguide, the light source configured to produce light having a selected wavelength, and wherein the waveguide comprises a material configured to propagate the light having the selected wavelength.

6. The HAMR device recited in claim 5, wherein the material is transparent.

7. The HAMR device recited in claim 5, wherein the material has a thermal conductivity greater than or equal to a thermal conductivity of silicon dioxide.

8. The HAMR device recited in claim 1, further comprising an anti-reflective mechanism between and adjacent to the waveguide and the rectangular portion.

9. The HAMR device recited in claim 1, wherein:
    a size of the rectangular portion is configured to induce a plurality of resonant plasmonic modes in the metal portion, and
    a size of the tapered portion is configured to select at least one particular mode of the plurality of resonant plasmonic modes and project the at least one particular mode to an air-bearing surface of the HAMR device.

10. The HAMR device recited in claim 1, wherein:
    a first dimension of the rectangular portion is less than approximately 140 nm, and
    a second dimension of the rectangular portion is less than approximately 150 nm.

11. The HAMR device recited in claim 1, wherein a cross-section of the tapered portion taken perpendicular to an air-bearing surface of the HAMR device in a deposition plane has a shape of an isosceles trapezoid.

12. The HAMR device recited in claim 11, wherein:
    a base of the isosceles trapezoid is between approximately 100 nm and approximately 150 nm,
    a top of the isosceles trapezoid is between approximately 30 nm and 70 nm, and
    a height of the isosceles trapezoid is between approximately 30 nm and 70 nm.

13. The HAMR device recited in claim 1, wherein a thickness of the insulator core is between approximately 10 nm and 25 nm.

14. The HAMR device recited in claim 1, further comprising:
    a first additional layer offset from the insulator core by a first distance in a down-track direction.

15. The HAMR device recited in claim 14, wherein the first additional layer is recessed from an air-bearing surface of the HAMR device by a second distance.

16. The HAMR device recited in claim 14, wherein the first additional layer is tapered near an air-bearing surface of the HAMR device.

17. The HAMR device recited in claim 14, wherein the first additional layer comprises an insulator or a semi-metal.

18. The HAMR device recited in claim 14, further comprising:
    a second additional layer offset from the first additional layer by a second distance in a down-track direction.

19. The HAMR device recited in claim 18, wherein the second additional layer is tapered near an air-bearing surface of the HAMR device.

20. The HAMR device recited in claim 18, wherein the second additional layer comprises an insulator or a semi-metal.

21. The HAMR device recited in claim 18, wherein:
the first additional layer is recessed by a third distance from an air-bearing surface (ABS) of the HAMR device, and
the second additional layer is recessed by a fourth distance from the ABS of the HAMR device, the fourth distance being greater than the third distance.

22. The HAMR device recited in claim 1, wherein the NFT further comprises a hard jacket surrounding at least part of the metal portion, the hard jacket comprising tungsten, chromium, or a dielectric material.

* * * * *